United States Patent [19]
Urai et al.

[11] Patent Number: 6,021,375
[45] Date of Patent: Feb. 1, 2000

[54] VEHICLE SAFETY RUNNING CONTROL SYSTEM

[75] Inventors: Yoshihiro Urai; Yoichi Sugimoto; Satoshi Hada; Shoji Ichikawa; Shohei Matsuda, all of Wako, Japan

[73] Assignee: Honda Giken Kogyo Kabushiki Kaisha, Tokyo, Japan

[21] Appl. No.: 09/225,570

[22] Filed: Jan. 5, 1999

[30] Foreign Application Priority Data

Jan. 13, 1998 [JP] Japan ................................. 10-018092

[51] Int. Cl.⁷ .................................................. G06F 13/376
[52] U.S. Cl. ............................... 701/301; 701/53; 701/70
[58] Field of Search ................................. 701/301, 53, 70

[56] References Cited

U.S. PATENT DOCUMENTS

| | | | |
|---|---|---|---|
| 4,491,840 | 1/1985 | Nishikawa et al. | 340/903 |
| 5,540,298 | 7/1996 | Yoshioka et al. | 180/169 |
| 5,594,414 | 1/1997 | Namngani | 340/436 |
| 5,748,477 | 5/1998 | Katoh | 701/301 |
| 5,864,285 | 1/1999 | Wieder et al. | 340/435 |

FOREIGN PATENT DOCUMENTS

6-298022   10/1994   Japan .

*Primary Examiner*—William A. Cuchlinski, Jr.
*Assistant Examiner*—Olga Hernandez
*Attorney, Agent, or Firm*—Nikaido, Marmelstein, Murray & Oram LLP

[57] ABSTRACT

A system for controlling running safety of a vehicle having at least a brake, a steering mechanism manipulated by a vehicle operator, a laser radar for detecting an obstacle present ahead on a course of travel of the vehicle, and a brake actuator mechanism actuating the brake independently of the vehicle operator manipulation. In the system, a first threshold value (defined in terms of relative distance between the vehicle and the obstacle) for avoiding contact with the obstacle by steering and a second threshold value for avoiding contact by operating the brake actuator mechanism are determined and are compared with the detected relative distance. When the detected relative distance is less than the first threshold value, the brake actuator mechanism is immediately operated to generate a relatively small deceleration, thereby enabling effective obstacle avoidance to well meet the intention and desires of the vehicle operator, without causing a problem of interference with the steering of the vehicle operator, while preventing the control accuracy from being degraded.

7 Claims, 6 Drawing Sheets

VEHICLE SAFETY RUNNING CONTROL SYSTEM

BACKGROUND OF THE INVENTION

1. Field of the Invention

This invention relates to a vehicle safety running control system, more particularly to a vehicle safety running control system which detects an obstacle present ahead of the vehicle to determine whether the vehicle may come in contact with the obstacle and operates the braking system, if necessary.

2. Description of the Related Art

Various obstacle avoidance techniques have hitherto been proposed. For example, Japanese Laid-open Patent Application Hei 6(1994)-298022 teaches detecting the distance (relative distance) to an obstacle (e.g., another vehicle running ahead on the road) from the vehicle and automatically operating (i.e., independently of the vehicle operator's brake pedal manipulation) the braking system (and an alarm) so as to avoid contact with the obstacle.

In this prior art technique, the acceleration of the other vehicle (obstacle) is detected and, based on the detected acceleration, a first threshold value (relative distance) for avoiding the obstacle by braking is determined. At the same time, a second threshold value (relative distance) for avoiding the obstacle by steering is determined based on the assumption that the subject vehicle moves to avoid the another vehicle with a lateral acceleration b0 after time τ, measured from a certain point.

The system operates the braking system automatically only when the detected relative distance falls below the first and the second threshold values. Since the braking system is not operated at unexpected times which are not anticipated by the vehicle operator, the operator does not experience annoyance caused by the automatic braking when he is intending to steer to avoid an obstacle, thereby improving the driving comfort and preventing annoyance of the vehicle operator.

The first threshold value for obstacle avoidance by braking is not always shorter than the second threshold value for that by steering. The relationship therebetween depends on the relative distance.

In the prior art system, however, even when the first threshold value is shorter than the second threshold value, the automatic braking is only effected if the relative distance drops below the first and second threshold values, more precisely, below the first threshold value. As a result, the automatic braking may sometimes be late, needing a large braking force (sudden braking) to be generated.

In such a case, it will be better to initiate the automatic braking earlier whenever it is found that the obstacle avoidance by steering is impossible, since this will not create a problem of interference with the operator's steering and will make it possible to conduct the obstacle avoidance more securely and more effectively. Moreover, this earlier automatic braking will match the intentions of the vehicle operator.

Furthermore, when the relative speed is small, the relative distance to initiate obstacle avoidance control, more specifically the threshold value (relative distance) for obstacle avoidance by automatic braking will usually be small. As a result, the control accuracy may sometimes be degraded depending on the performance of an obstacle detector such as a laser radar or a millimeter-wave radar (e.g., the scanning area, scanning accuracy and resolving power of the radar).

SUMMARY OF THE INVENTION

An object of the invention is therefore to overcome the foregoing problems and to provide a vehicle safety running control system which operates the braking system when it has been determined that an obstacle is unavoidable by steering, thereby enabling effective obstacle avoidance to well meet the intention and desires of the vehicle operator, without causing a problem of interference with the steering of the vehicle operator, while preventing the control accuracy from being degraded.

Another object of the invention is to provide a vehicle safety running control system which operates the braking system to generate a deceleration which is better matched to the intention and desires of the vehicle operator.

To achieve these objects, the invention provides a system for controlling safety running of a vehicle having at least a brake and a steering mechanism manipulated by a vehicle operator, comprising: obstacle detecting means for detecting an obstacle present ahead on a course of travel of the vehicle; brake actuating means for actuating the brake, independently of the manipulation by the vehicle operator; vehicle speed detecting means for detecting a traveling speed of the vehicle; relative distance detecting means for detecting a relative distance between the vehicle and the detected obstacle based on a result of detection by the obstacle detecting means; relative speed detecting means for detecting a relative speed between the vehicle and the detected obstacle based on the result of detection by the obstacle detecting means; first obstacle avoidance possibility determining means for determining whether a contact with the obstacle is avoidable by steering input through the steering mechanism by the vehicle operator based on at least the detected vehicle speed, the detected relative distance and the detected relative speed; second obstacle avoidance possibility determining means for determining whether a contact with the obstacle is avoidable by operating the brake actuating means based on at least the detected vehicle speed, the detected relative distance and the detected relative speed; and brake operation control means for determining a deceleration of the vehicle to be generated based on a result of determination of the second obstacle avoidance possibility determining means and for operating the brake actuating means based on the determined deceleration, when the first obstacle avoidance possibility determining means determines that the contact with the obstacle is not avoidable by steering.

BRIEF EXPLANATION OF DRAWINGS

This and other objects and advantages of the invention will be made more apparent with the following description and drawings, in which.

DETAILED DESCRIPTION OF THE PREFERRED EMBODIMENTS

Embodiments of the invention will now be explained with reference to the attached drawings.

Figure 1:
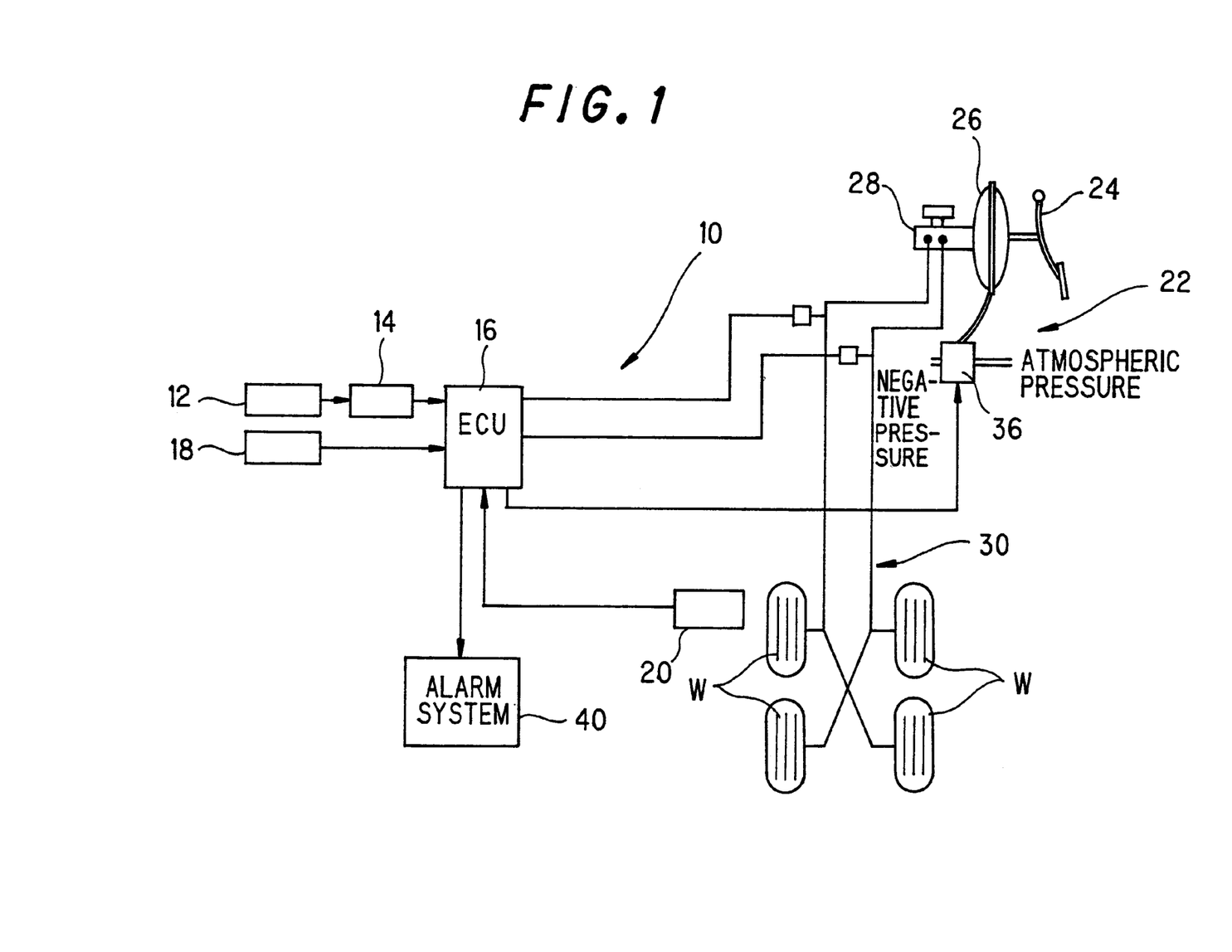
FIG. 1 is an overall schematic view showing the configuration of a vehicle safety running control system according to the invention.

FIG. 1 is an overall schematic view showing the configuration of a vehicle safety running control system according to the invention.

In the figures, reference numeral 10 designates a vehicle (partially illustrated by a wheel W, etc) having a steering mechanism (not shown) manipulated by the vehicle operator. A laser radar (or lidar) 12 which is mounted in the proximity of the headlight (not shown) emits a laser beam (a narrow beam of coherent, powerful and nearly nonchromatic electromagnetic radiation energy) horizontally along the course of vehicle travel and receives an energy reflected from an obstacle or object (such as another vehicle present ahead of the subject vehicle 10).

The laser radar 12 is connected to a radar output processing unit 14 which is comprised of a microcomputer. The radar output processing unit 14 detects the distance (relative distance) to an obstacle or object from the vehicle 10 by measuring the time interval between transmission of the energy and reception of the reflected energy, which establishes the range of the obstacle in the beam's path. Moreover, the laser radar output processing unit 14 detects the (relative) speed of the obstacle by differentiating the measured distance, and detects the direction or orientation of the obstacle from the reflected energy to obtain two-dimensional information describing the obstacle. The output of the laser radar 12 is forwarded to an ECU (Electronic Control Unit) 16 which is also comprised of a microcomputer.

A yaw rate sensor 18 is provided at the center of the vehicle 10 to generate a signal indicative of the yaw rate (yaw angular velocity acting at the center of gravity of the vehicle 10 about the gravitational or vertical direction). The output of the yaw rate sensor 20 is sent to the ECU 16. The ECU 16 detects the yaw angle based on the output of the yaw rate sensor 20. A vehicle speed sensor 20 is provided in the proximity of a drive shaft (not shown) to generate a signal indicative of the vehicle (traveling or road) speed of the vehicle 10. The output of the vehicle speed sensor 20 is also sent to the ECU 16.

Reference numeral 22 indicates a braking system of the vehicle 10. In the braking system 22, a foot brake (brake pedal) 24 is connected, via a negative-pressure booster 26, to a master cylinder 28. The negative-pressure booster 26 has a diaphragm (not shown) which partitions the inside of the booster into two chambers such that the ratio of the negative pressure introduced from the engine intake system (not shown) relative to the atmospheric pressure introduced from outside of the engine is regulated to determine the position of the diaphragm which determines the force to boost the vehicle operator's brake pedal depression.

The master cylinder 28 supplies, via oil paths 30, hydraulic pressure (brake fluid pressure), at a pressure in response to the boosted braking force, to the brake (not shown) provided at the respective wheels W to slow or stop the rotation thereof. Thus, the vehicle is slowed and stopped at a rate of deceleration determined by the braking force.

An electromagnetic solenoid valve 36 is provided at an appropriate location of the introduction system of the negative pressure and atmospheric pressure (not fully shown). The electromagnetic solenoid valve 36 is connected, via a driver circuit (not shown), to the ECU 16 to receive a command signal (a duty-ratio signal in Pulse Width Modulation) generated by the ECU 16. The electromagnetic solenoid valve 36 opens/closes in response to the command signal to regulate the ratio of the negative pressure relative to the atmospheric pressure and operates the braking system 22 to automatically brake (i.e., to decelerate independently of the vehicle operator's brake pedal depression) the vehicle.

An alarm system (e.g., an audio system or visible indicator) 40 is provided in the proximity of the vehicle operator's seat (not shown) and is connected to the ECU 16 to receive a command signal, and alerts the vehicle operator in response to the command signal generated by the ECU 44.

The operation of the vehicle safety running control system according to the invention will next be explained.

Figure 2:
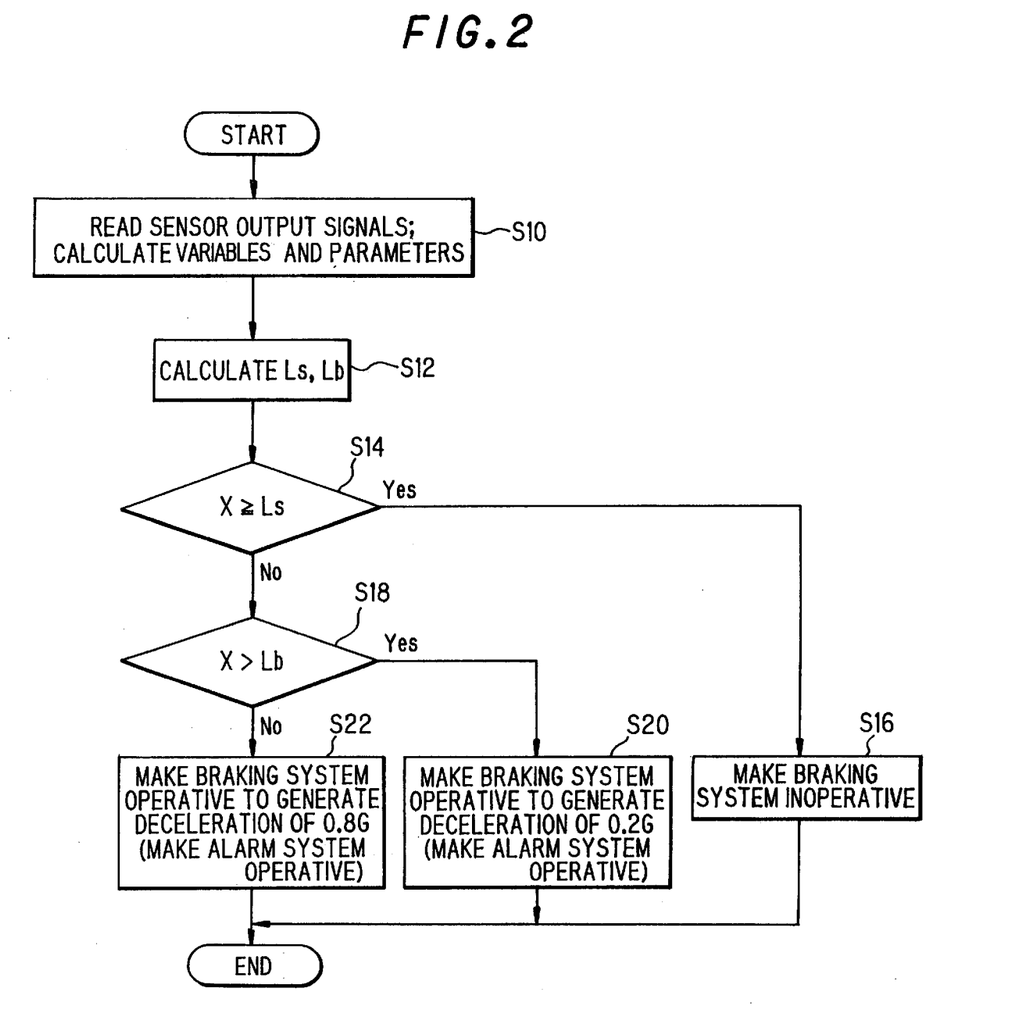
FIG. 2 is a flow chart showing the operation of the system illustrated in FIG. 1.

FIG. 2 is a flow chart showing the operation of the system. The program shown there is executed, for example, once every 100 milliseconds.

Figure 3:
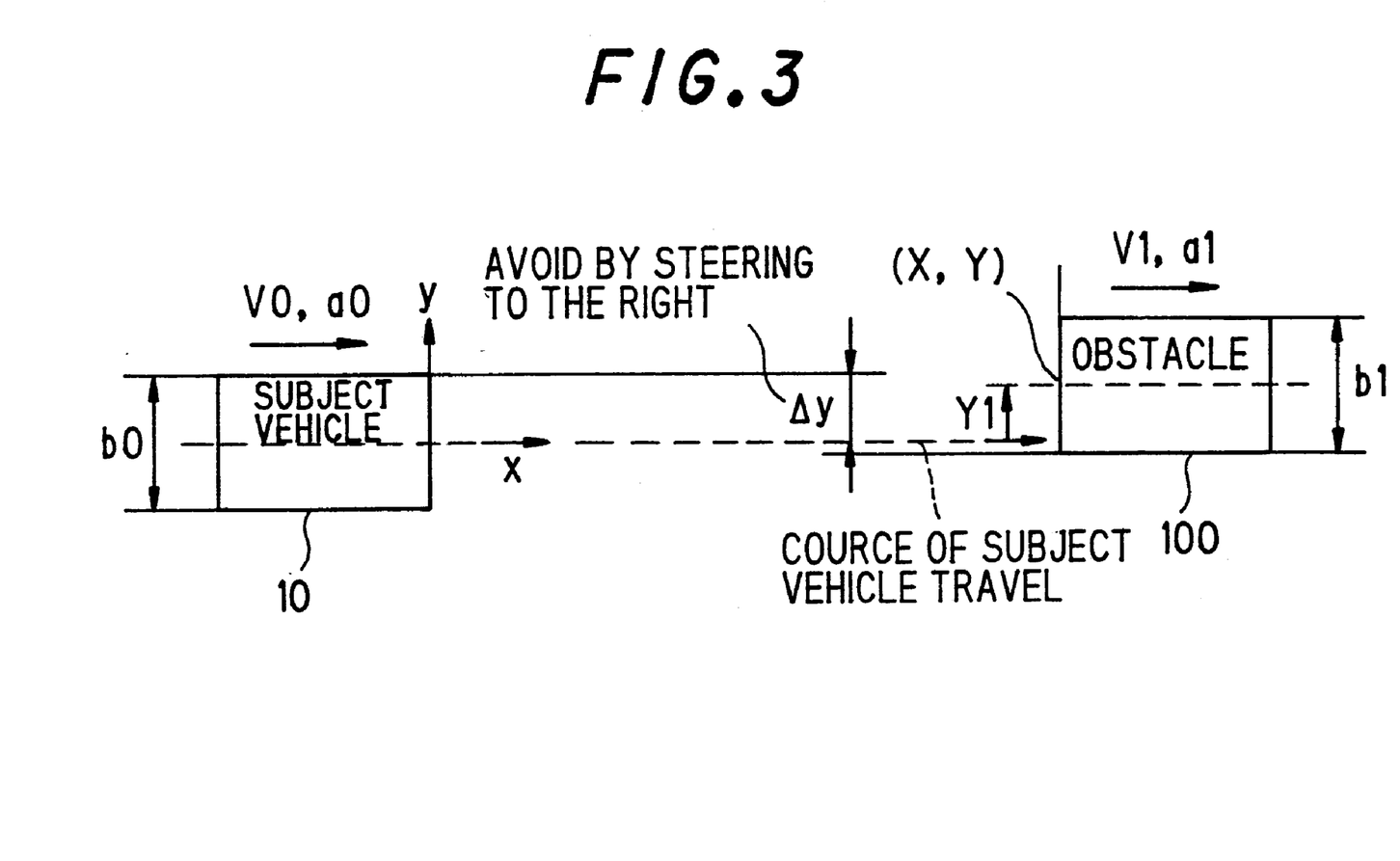
FIG. 3 is an explanatory view showing the subject vehicle and an obstacle including an overlapping amount to be used for determining a threshold value for avoiding the obstacle by steering referred to in the flow chart of FIG. 2.

Before entering the explanation of the flow chart, however, the operation of the system is briefed with reference to FIG. 3.

In the system, when an obstacle (such as another vehicle running ahead on the road) 100 is detected, the relative position of the obstacle or object 100 is determined as (X, Y) in the coordinate system whose origin is set to the subject vehicle 10 taking the x-direction in the course of travel and the y-direction lateral thereto. The value X indicates the distance to the obstacle 100 from the subject vehicle 10 and the value Y indicates the position horizontally transverse to the x-direction, as illustrated in FIG. 3.

At the same time, the width b1, the moving speed V1 and the acceleration a1 of the obstacle 100 are determined. Similarly, the vehicle speed V0, the acceleration a0 and the yaw rate ω of the subject vehicle 10 are determined.

Next, a threshold value (in terms of relative distance) Ls is determined, as the minimum or marginal distance in which the vehicle operator is expected to steer the vehicle via the steering mechanism to avoid the contact with the obstacle 100.

Explaining this, a future course of the subject vehicle 10 is predicted or estimated from the determined vehicle speed V0, the acceleration a0 and the yaw rate ω of the subject vehicle 10 and based on the predicted course and the relative position (X, Y) of the obstacle 100, a lateral difference Y1 of the obstacle 100 relative to the course of subject vehicle 10 is calculated.

Then, assuming that the obstacle 100 will move in the same course as the subject vehicle 10, an overlapping amount (amount of lateral movement) Δy necessary for the subject vehicle 10 to avoid the obstacle 100 by the vehicle operator's steering, is calculated as follows:

in avoiding to the right: $\Delta y = \{(b0+b1)/2\} - Y1$ in avoiding to the left: $\Delta y = \{(b0+b1)/2\} + Y1$ When Δy becomes a negative value, since no action is needed for avoidance, it is set to be 0 (the minimum value).

Then, data obtained through experimentation and prepared and stored beforehand in the ECU 16 is retrieved using the overlapping amount Δy, the vehicle speed V0, the acceleration a0 and the yaw rate ω of the subject vehicle 10 as address data to determine or calculate times necessary for avoiding the obstacle 100 by steering to the left and right, i.e., the times necessary for the subject vehicle to move by the overlapping amount Δy laterally (in the y-axis) relative to the course of travel, to avoid to the right and left.

Figure 4:
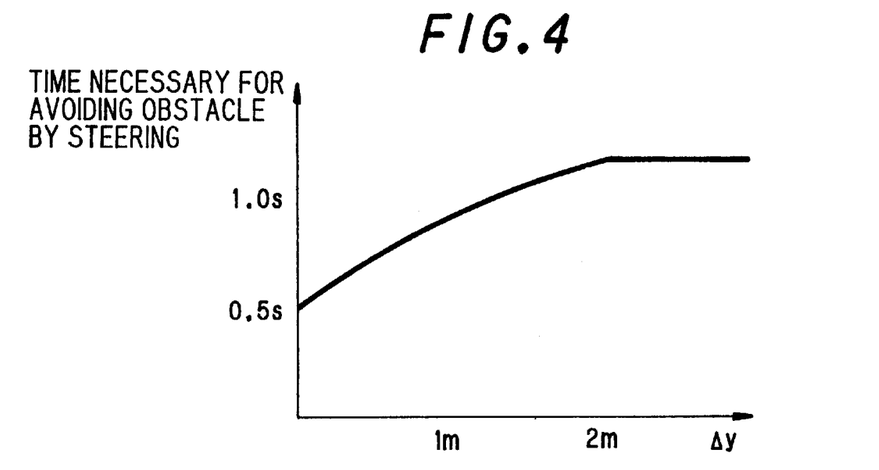
FIG. 4 is an explanatory graph explaining a time necessary for avoiding contact with the obstacle by steering to be used for determining the threshold value for avoiding the obstacle by steering referred to in the flow chart of FIG. 2.

FIG. 4 shows the time (necessary for avoiding the obstacle 100 by steering) set relative to the overlapping amount Δy on the assumption that the subject vehicle 10 and the obstacle 100 will move forward in the same course.

Naming the shorter one of the times in avoiding to the right and left as Ts and defining the distances that the subject vehicle 10 and the obstacle 100 will move during the time Ts as Xn, more specifically, the distance that the subject vehicle 10 moves during the time Ts as X0 and that the obstacle 100 moves during the time Ts as X1, X0 and X1 are calculated as follows:

$$X0 = V0 \cdot Ts + (1/2) \cdot a0 \cdot Ts^2$$

$$X1 = V1 \cdot Ts + (1/2) \cdot a1 \cdot Ts^2$$

In other words, the relative distance (the distance between the subject vehicle 10 and the obstacle 100) will be shortened by X0−X1 while the obstacle 100 is avoided by steering. Accordingly, defining a threshold value (the relative distance) for avoiding contact with the obstacle 100 by steering the subject vehicle 10 as Ls, the value is calculated as follows:

$$\begin{aligned} Ls &= X0 - X1 \\ &= \{V0 \cdot Ts + (1/2) \cdot a0 \cdot Ts^2\} - \{V1 \cdot Ts + (1/2) \cdot a1 \cdot Ts^2\} \\ &= (V0 - V1) \cdot Ts + (1/2) \cdot (a0 - a1) \cdot Ts^2 \end{aligned}$$

Then, a threshold value (in terms of relative distance) for avoiding contact with the obstacle 100 by the automatic braking, named Lb, is determined. Lb is the minimum or marginal distance necessary for avoiding contact by operating the braking system 22.

Defining the acceleration of the subject vehicle 10 generated by the automatic braking as ab and that of the obstacle as a1, the vehicle speed V0t of the subject vehicle 10 and the moving speed V1t of the obstacle 100 after a time t is calculated as follows:

$$V0t = V0 + ab \cdot t$$

$$V1t = V1 + a1 \cdot t$$

Here, although the accelerations ab, a1 are, more precisely, the deceleration, ab, a1 are expressed in positive values.

In order to avoid contact by braking, the vehicle speed of the subject vehicle 10 should be made less than the moving speed of the obstacle 100. The minimum time for doing this is a time necessary for avoiding contact by braking. Defining this time as Tb, it is calculated as follows:

$$V0 + ab \cdot Tb = V1 + a1 \cdot Tb$$

This can be rewritten as follows:

$$Tb = -(V0 - V1)/(ab - a1)$$

Consequently, the relative distance which will be shortened during the time Tb is threshold value Lb for avoiding contact by braking. This is calculated as follows.

$$Lb = -(1/2) \cdot (V0 - V1)^2/(ab - a1)$$

In the above, although the obstacle acceleration a1 is measured, an estimated or assumed value may instead be used.

Figure 5:
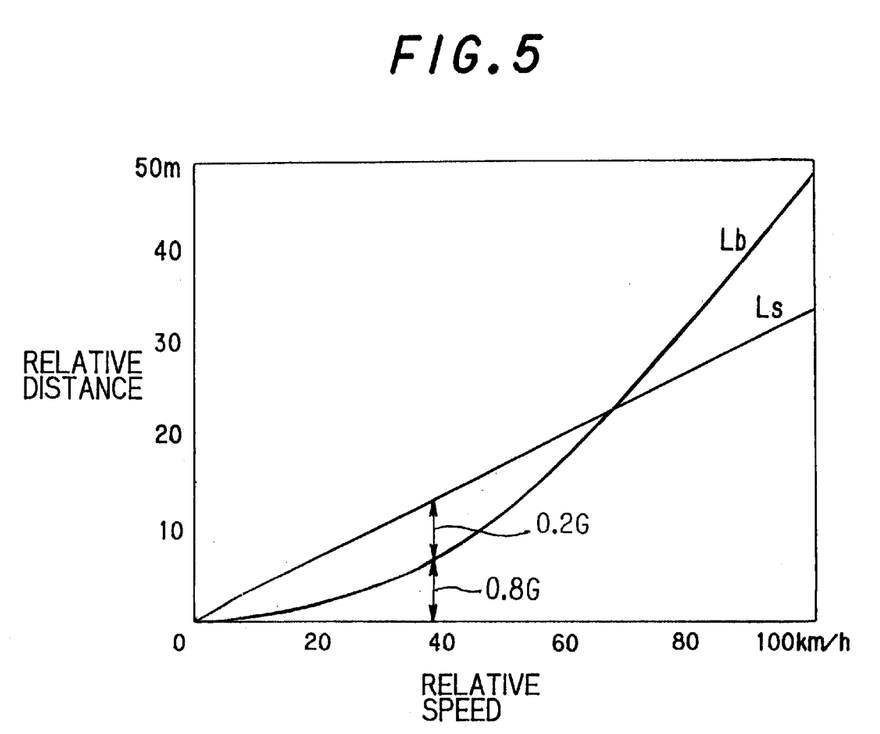
FIG. 5 is an explanatory graph showing the threshold value for avoiding the obstacle by steering and another threshold value for avoiding the obstacle by braking referred to in the flow chart of FIG. 2.

FIG. 5 is an explanatory graph showing the relationship between the threshold values (relative distances) Ls, Lb on the assumption that Ts is 1.2 sec., the obstacle 100 is under uniform motion at a1=0G (G: a value corresponding the acceleration of gravity), and the acceleration (more precisely deceleration) of the subject vehicle 10 is 0.8G (more precisely −0.8G). As illustrated, Ls is greater than Lb when the relative speed is less than 65 km/h.

Based on the above, the operation of the vehicle safety running control system according to the invention is explained with reference to the flow chart of FIG. 2.

The explanation is made taking the region where the relative speed is less than 65 km/h, in which Ls is greater than Lb, as an example. However, the explanation will similarly be applied to the region where the relative speed is not less than 65 km/h when the algorithm is changed slightly.

The program begins in S10 in which the output signals of the sensors are read and the variables and parameters are calculated in the manner mentioned above. The program then proceeds to S12 in which the threshold values Ls, Lb are calculated.

The program next proceeds to S14 in which it is determined whether the detected (measured or actual) relative distance X is not less than the threshold value (the relative distance for contact avoidance by steering) Ls. When the result is affirmative, the program proceeds to S16 in which the automatic braking system is made inoperative, more precisely in which the electronic solenoid valve 36 is made inoperative.

Specifically, when the detected relative distance X is not less than the threshold value Ls, it can be anticipated that the vehicle operator will avoid the contact with the obstacle by steering by himself and hence, no automatic braking is needed.

On the other hand, when the result in S14 is negative, the program proceeds to S18 in which it is again determined whether the detected (measured or actual) relative distance X is more than the threshold value (the relative distance for contact avoiding by braking) Lb.

When the result in S18 is affirmative, since this means that the contact can be avoided by braking, the program proceeds to S20 in which the automatic braking system is controlled via the electromagnetic valve 32 to generate a deceleration of 0.2G to slow or stop the subject vehicle 10. At the same time, the alarm system 40 is made operative to alert the vehicle operator, if needed. Thus, the automatic braking is immediately started after it has been determined that the contact avoidance by steering is not possible.

Here, since the affirmative result in S18 means that there still is time to avoid a possible contact, the automatic braking is made operative in S20 such that the deceleration of the subject vehicle 10 is relatively small value (e.g., 0.2G). The ECU 16 determines and sends the command signal (duty-ratio), via the driver circuit, to the electromagnetic solenoid valve 36 to drive the same to generate the determined deceleration.

On the other hand, when the result in S18 is negative, although this means that contact will be unavoidable, the program proceeds to S22 in which the automatic braking is effected to generate the maximum deceleration (e.g., 0.8G).

As explained above, since the system initiates the automatic braking immediately after it is determined that the contact avoidance by steering is impossible, contact with the obstacle 100 can effectively be avoided, without causing a problem of interference with the vehicle operator's steering. The control will thus be well matched to the intention and desires of the vehicle operator.

Moreover, since the contact avoidance control can be commenced at a large relative distance, even if the accuracy and resolving power, etc., of the laser radar 12 is not sufficient, the accuracy of obstacle avoidance is not degraded.

Furthermore, since the vehicle deceleration is set to be a relatively small value such as 0.2G if there still is time to avoid a possible contact, the control will better be matched to the intention and desires of the vehicle operator.

Figure 6:
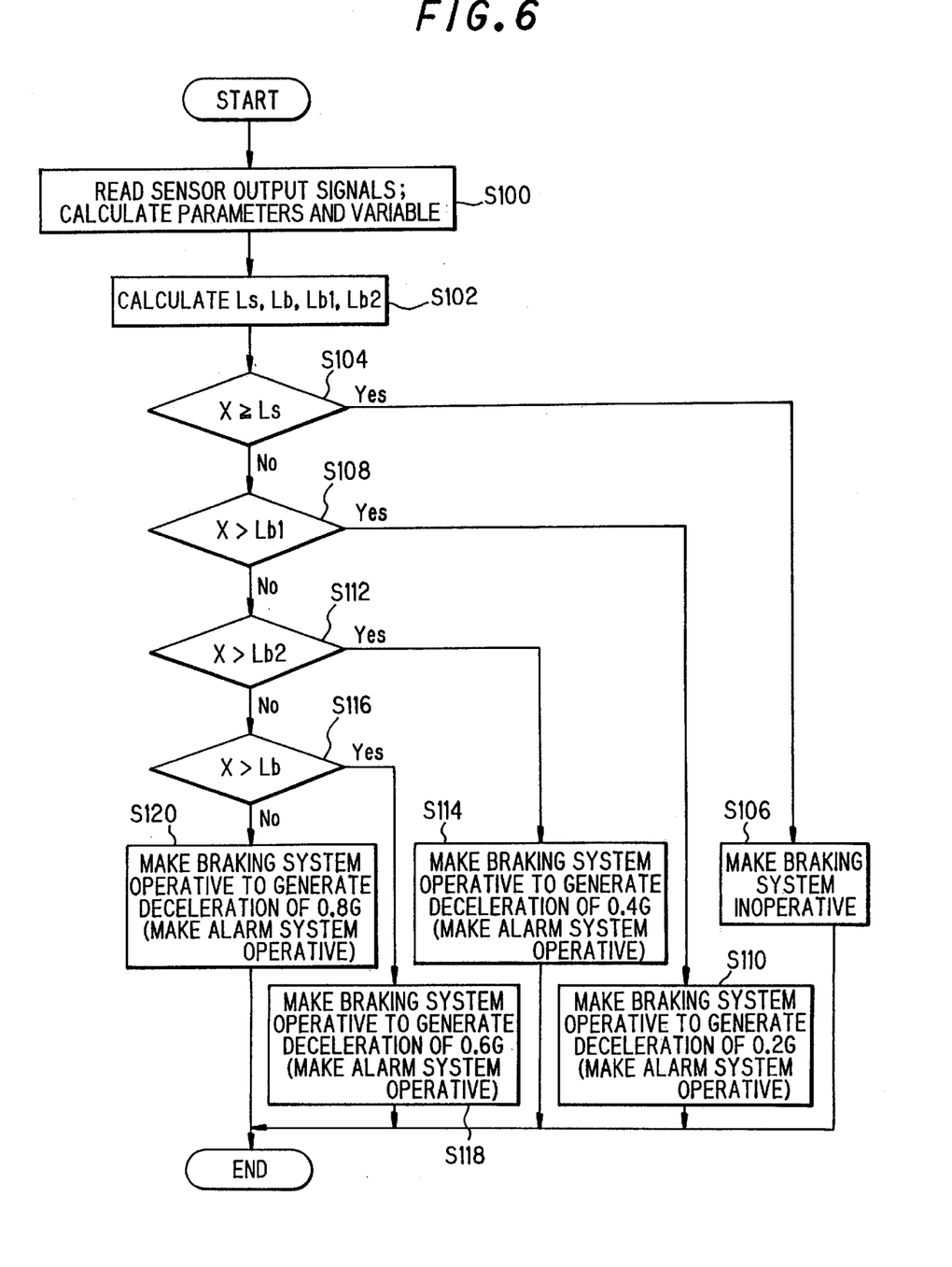
FIG. 6 is a flow chart, similar to FIG. 2, but showing the operation of the system according to a second embodiment of the invention.

FIG. 6 is a flow chart, similar to FIG. 2, but showing the operation of the system according to a second embodiment of the invention.

Figure 7:
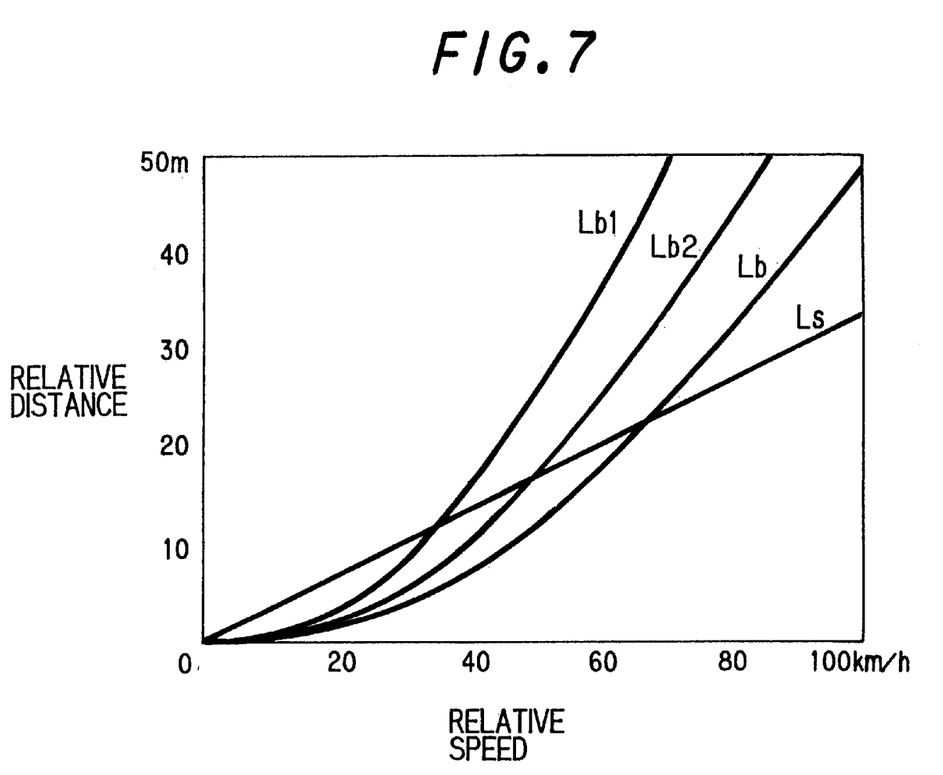
FIG. 7 is an explanatory graph, similar to FIG. 5, but showing the threshold values including additional ones referred to in the flow chart of FIG. 6.

Explaining the second embodiment with reference to FIG. 7, the vehicle deceleration by the automatic braking is set to be a small value such as 0.2G when the detected relative distance is less than Ls, but is greater than Lb in the first embodiment. Occasionally, after the automatic braking has been started at 0.2G, the detected relative distance X decreases below Lb such that sudden braking at 0.8G is needed.

The sudden change in the vehicle acceleration may cause the vehicle operator and other occupants if any to experience annoyance. It would be better to control the deceleration in proportion to the possibility that the subject vehicle 10 will come in contact with the obstacle 100, in other words, in response to the magnitude of the threshold value.

For that reason, in addition to the aforesaid threshold values Ls and Lb (relative distances for contact avoidance by braking), two more values Lb1, Lb2 are prepared in a stepwise fashion in the second embodiment. The additional threshold values Lb1, Lb2 are calculated as follows:

$Lb1=-(1/2)\cdot(V0-V1)^2/(ab1-a1)$ (Here: $ab1=-0.4G$)

$Lb2=-(1/2)\cdot(V0-V1)^2/(ab2-a1)$ (Here: $ab2=-0.6G$)

In the above, Lb1, Lb2 are threshold values (relative distances) which indicate that the subject vehicle 10 should avoid contact with the obstacle 100 by generating a deceleration of 0.4G or 0.6G. In that sense, the aforesaid Lb is a threshold value (relative distance) which indicates that the contact avoidance should generate the deceleration of 0.8G.

FIG. 7 shows these threshold values Lb, Lb1, Lb2 as well as Ls (for contact avoidance by steering) defined by the relative distance relative to the relative speed.

Based on the above, the operation of the system according to the second embodiment of the invention is explained with reference to the flow chart of FIG. 6.

The program begins in S100 in which the sensor outputs are read and the variables are parameters are calculated, and proceeds to S102 in which the threshold values are calculated, to S104 in which it is determined whether the detected (measured) relative distance X is not less than Ls. When the result is affirmative, the program proceeds to S106 in which the automatic braking system is made inoperative.

On the other hand, when the result in S104 is negative, since this means that the contact avoidance by steering is impossible, the program proceeds to S108 in which it is determined whether the detected relative distance X is not less than Lb1. When the result is affirmative, the program proceeds to S110 in which the braking system 22 is controlled to generate a deceleration of 0.2G.

When the result in S108 is negative, the program proceeds to S112 in which it is determined whether the detected relative distance X is not less than Lb2. When the result is affirmative, the program proceeds to S114 in which the braking system is controlled to generate a deceleration of 0.4G.

When the result in S112 is negative, the program proceeds to S116 in which it is determined whether the detected relative distance X is not less than Lb. When the result is affirmative, the program proceeds to S118 in which the braking system is controlled to generate a deceleration of 0.6G.

When the result in S116 is negative, the program proceeds to S120 in which the braking system 22 is controlled to generate a maximum deceleration of 0.8G.

Since the deceleration is controlled stepwise in the second embodiment, this control will be better matched to the intention and desires of the vehicle operator.

To be more specific, since the deceleration is made variable, it becomes possible to operate the automatic braking at a deceleration appropriate to the vehicle running condition or environment. The vehicle operator (and occupants if any) will not experience annoyance due to a sharp (or unnecessary) change in deceleration. Thus, the control by the system according to the second embodiment will better be matched to the intention and desires of the vehicle operator and occupants.

The embodiment is thus configured to have a system for controlling safety running of a vehicle (10) having at least a brake (braking system 22) and a steering mechanism manipulated by a vehicle operator, comprising: obstacle detecting means (laser radar 12, radar output processing unit 14, S10, S100) for detecting an obstacle (100) present ahead on a course of travel of the vehicle; brake actuating means (electromagnetic solenoid valve 22) for actuating the brake (braking system 22), independently of the manipulation by the vehicle operator; vehicle speed detecting means (vehicle speed sensor 20, S10, S100) for detecting a traveling speed (V) of the vehicle; relative distance detecting means (S10, S100) for detecting a relative distance between the vehicle and the detected obstacle based on a result of detection by the obstacle detecting means; relative speed detecting means (S10, S100) for detecting a relative speed between the vehicle and the detected obstacle based on the result of detection by the obstacle detecting means; first obstacle avoidance possibility determining means (S12, S102) for determining whether a contact with the obstacle is avoidable by steering input through the steering mechanism by the vehicle operator based on at least the detected vehicle speed, the detected relative distance and the detected relative speed; second obstacle avoidance possibility determining means (S10, S102) for determining whether a contact with the obstacle is avoidable by operating the brake actuating means based on at least the detected vehicle speed, the detected relative distance and the detected relative speed; and brake operation control means (S14 to S22, S104 to S120) for determining a deceleration of the vehicle to be generated based on a result of determination of the second obstacle avoidance possibility determining means and for operating the brake actuating means based on the determined deceleration, when the first obstacle avoidance possibility determining means determines that the contact with the obstacle is not avoidable by steering.

In the system, the first obstacle avoidance possibility determining means includes: overlapping amount calculating means (S12, S102) for calculating an amount (Δy) which the vehicle and the detected obstacle overlap in a direction lateral to the course of travel of the vehicle; and determines whether the contact with the obstacle is avoidable by steering based on at least the calculated overlapping amount.

In the system, the brake operation control means determines the deceleration of the vehicle to be generated based on at least one of the detected relative speed and the detected relative distance.

In the system, the first obstacle avoidance possibility determining means (S12, S102) further includes: time calculating means (S12, S102) for calculating a time (Ts) necessary for the vehicle to move by the overlapping amount from the course of travel; distance calculating means (S12, S102) for calculating a first distance (X0) which the vehicle moves during the time and a second distance (X1) which the obstacle moves during the same time; threshold value determining means (S12, S102) for determining a threshold value (Ls) based on a difference between the first and second distances; and comparing means (S14, S104) for comparing the detected relative distance (X) with the threshold value;

and possibility determining means (S14, S104) for determining that the contact with the obstacle is not avoidable by steering when the detected relative distance is less than the threshold value.

In the system, the second obstacle avoidance possibility determining means includes: second time calculating means (S12, S102) for calculating a second time (Tb) necessary for making the vehicle speed less than a moving speed of the obstacle; second threshold value determining means (S12, S102) for determining a second threshold value (Lb) based on the relative distance which will be shortened during the second time; and second comparing means (S18, S108, S112, S116) for comparing the detected relative distance with the second threshold value; and wherein the deceleration is determined based on a result of comparison.

In the system, the second threshold value determining means determines a plurality of second threshold values (Lb, Lb1, Lb2); the second comparing means compares the detected relative distance with the plurality of second threshold values respectively; and determines the deceleration based on respective results of comparisons.

The system further includes: an alarm (alarm system 22) for alerting the vehicle operator; and wherein the brake operation control means operates the alarm when operating the brake actuating means (S20, S22, S110, S114, S118, S120).

In the above, although the laser radar 12 is used as a means for detecting an obstacle, a millimeter-wave radar 14 or a visionary sensor such as a CCD camera may instead be used.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling safety running of a vehicle having at least a brake and a steering mechanism manipulated by a vehicle operator, comprising:

obstacle detecting means for detecting an obstacle present ahead on a course of travel of the vehicle;

brake actuating means for actuating the brake, independently of the manipulation by the vehicle operator;

vehicle speed detecting means for detecting a traveling speed of the vehicle;

relative distance detecting means for detecting a relative distance between the vehicle and the detected obstacle based on a result of detection by the obstacle detecting means;

relative speed detecting means for detecting a relative speed between the vehicle and the detected obstacle based on the result of detection by the obstacle detecting means;

first obstacle avoidance possibility determining means for determining whether a contact with the obstacle is avoidable by steering input through the steering mechanism by the vehicle operator based on at least the detected vehicle speed, the detected relative distance and the detected relative speed;

second obstacle avoidance possibility determining means for determining whether a contact with the obstacle is avoidable by operating the brake actuating means based on at least the detected vehicle speed, the detected relative distance and the detected relative speed; and brake operation control means for determining a deceleration of the vehicle to be generated based on a result of determination of the second obstacle avoidance possibility determining means and for operating the brake actuating means based on the determined deceleration, when the first obstacle avoidance possibility determining means determines that the contact with the obstacle is not avoidable by steering.

2. A system according to claim 1, further including;

an alarm for alerting the vehicle operator;

and wherein the brake operation control means operates the alarm when operating the brake actuating means.

3. A system according to claim 1, wherein the first obstacle avoidance possibility determining means includes:

overlapping amount calculating means for calculating an amount which the vehicle and the detected obstacle overlap in a direction lateral to the course of travel of the vehicle;

and determines whether the contact with the obstacle is avoidable by steering based on at least the calculated overlapping amount.

4. A system according to claim 3, wherein the first obstacle avoidance possibility determining means further includes:

time calculating means for calculating a time necessary for the vehicle to move by the overlapping amount from the course of travel;

distance calculating means for calculating a first distance which the vehicle moves during the time and a second distance which the obstacle moves during the same time;

threshold value determining means for determining a threshold value based on a difference between the first and second distances;

comparing means for comparing the detected relative distance with the threshold value; and possibility determining means for determining that the contact with the obstacle is not avoidable by steering when the detected relative distance is less than the threshold value.

5. A system according to claim 1, wherein the brake operation control means determines the deceleration of the vehicle to be generated based on at least one of the detected relative speed and the detected relative distance.

6. A system according to claim 5, wherein the second obstacle avoidance possibility determining means includes:

second time calculating means for calculating a second time necessary for making the vehicle speed less than a moving speed of the obstacle;

second threshold value determining means for determining a second threshold value based on the relative distance which will be shortened during the second time; and second comparing means for comparing the detected relative distance with the second threshold value;

and wherein the deceleration is determined based on a result of comparison.

7. A system according to claim 6, wherein:

the second threshold value determining means determines a plurality of second threshold values;

the second comparing means compares the detected relative distance with the plurality of second threshold values respectively;

and determines the deceleration based on respective results of comparisons.

* * * * *